United States Patent [19]

Calder

[11] Patent Number: 4,513,983

[45] Date of Patent: Apr. 30, 1985

[54] POINT-OF-PURCHASE ADVERTISING FOR SHOPPING CARTS

[76] Inventor: Robert E. Calder, 9292 Cincinnati-Dayton Rd., Cincinnati, Ohio 45241

[21] Appl. No.: 462,096

[22] Filed: Jan. 28, 1983

[51] Int. Cl.³ .............................................. G09F 11/02
[52] U.S. Cl. ................................. 280/33.99 A; 40/308
[58] Field of Search .................. 280/33.99 A; 40/308, 40/309

[56] References Cited

U.S. PATENT DOCUMENTS

| | | | |
|---|---|---|---|
| 2,687,589 | 8/1954 | Brockway | 40/308 |
| 2,962,827 | 12/1970 | Lachance et al. | 280/33.99 A |
| 3,270,454 | 9/1966 | Lachance | 40/308 |
| 3,281,978 | 11/1966 | Drugan et al. | 40/308 |
| 4,021,953 | 5/1977 | Couch | 40/308 |

Primary Examiner—Richard A. Bertsch
Attorney, Agent, or Firm—Edmund S. Lee, III

[57] ABSTRACT

A shopping cart is disclosed with a point-of-purchase advertising display which includes an octagonal, transparent display tube, rotatably mounted adjacent the cart's handle. The display tube is mounted on a shaft which is journaled on brackets on the cart's frame, thus isolating the tube from stresses arising from abuse of the cart. Advertising strips are mounted within the display tube for viewing as the tube is rotated by the cart's user. These strips may be replaced through use of a temporary support, as trunnions supporting the shaft are shifted outwardly to permit removal of the end cap of the display assembly. In another embodiment, a portion of the end cap is separately removable to permit replacement of the advertising strips. In a third embodiment, the shaft is omitted and the end caps are journaled on trunnions projecting from brackets on the frame of the cart. Also described is a method for assuring free rotation of the advertising display, when it is mounted on the frame of a cart.

15 Claims, 14 Drawing Figures

U.S. Patent  Apr. 30, 1985  Sheet 1 of 4  4,513,983
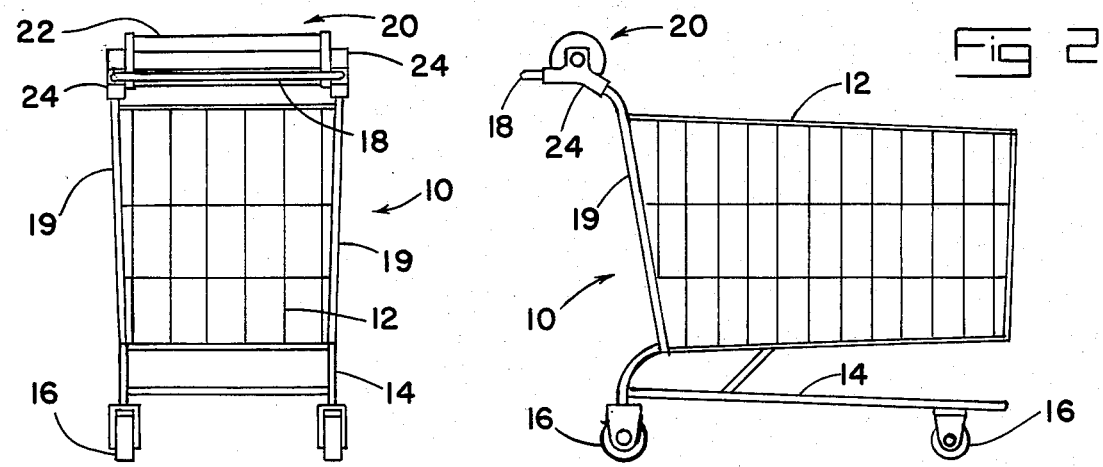
Fig 2
Fig 1
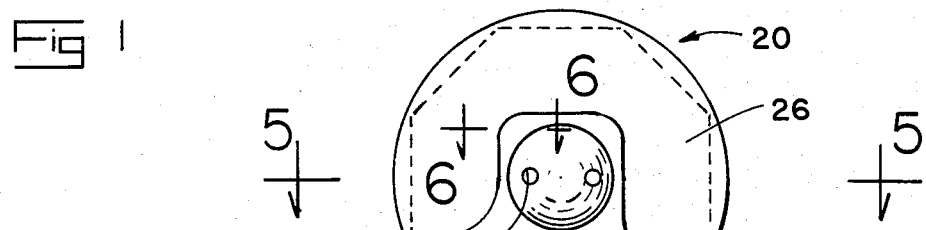
Fig 3
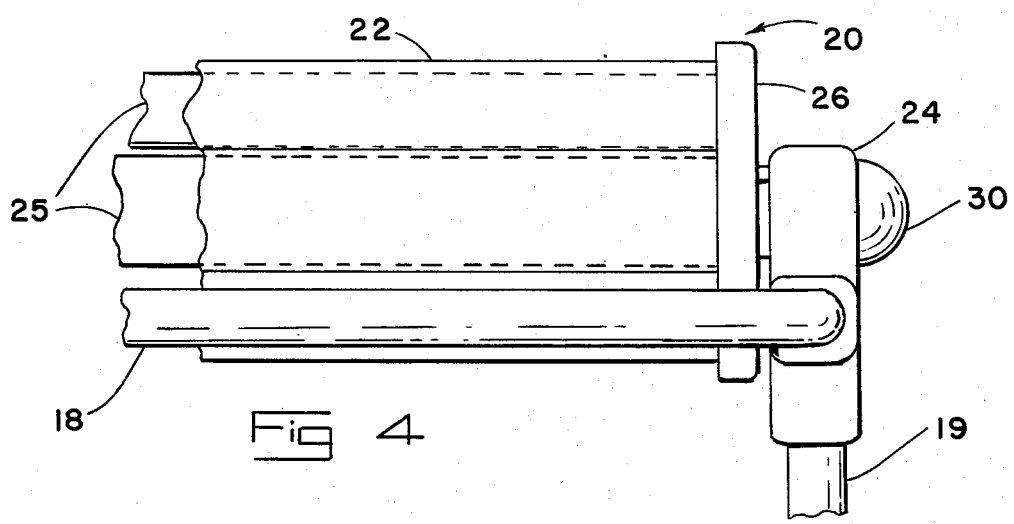
Fig 4

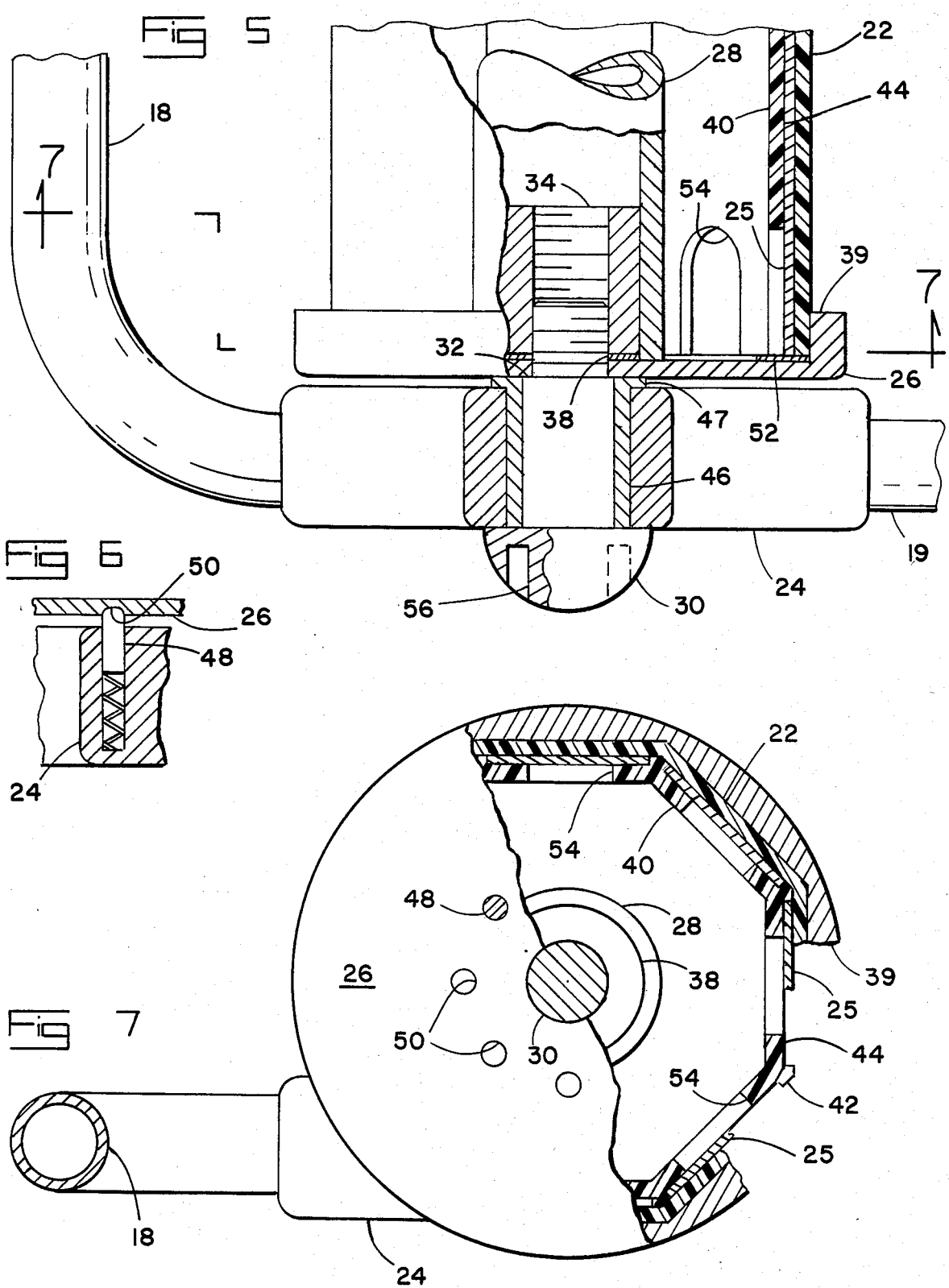

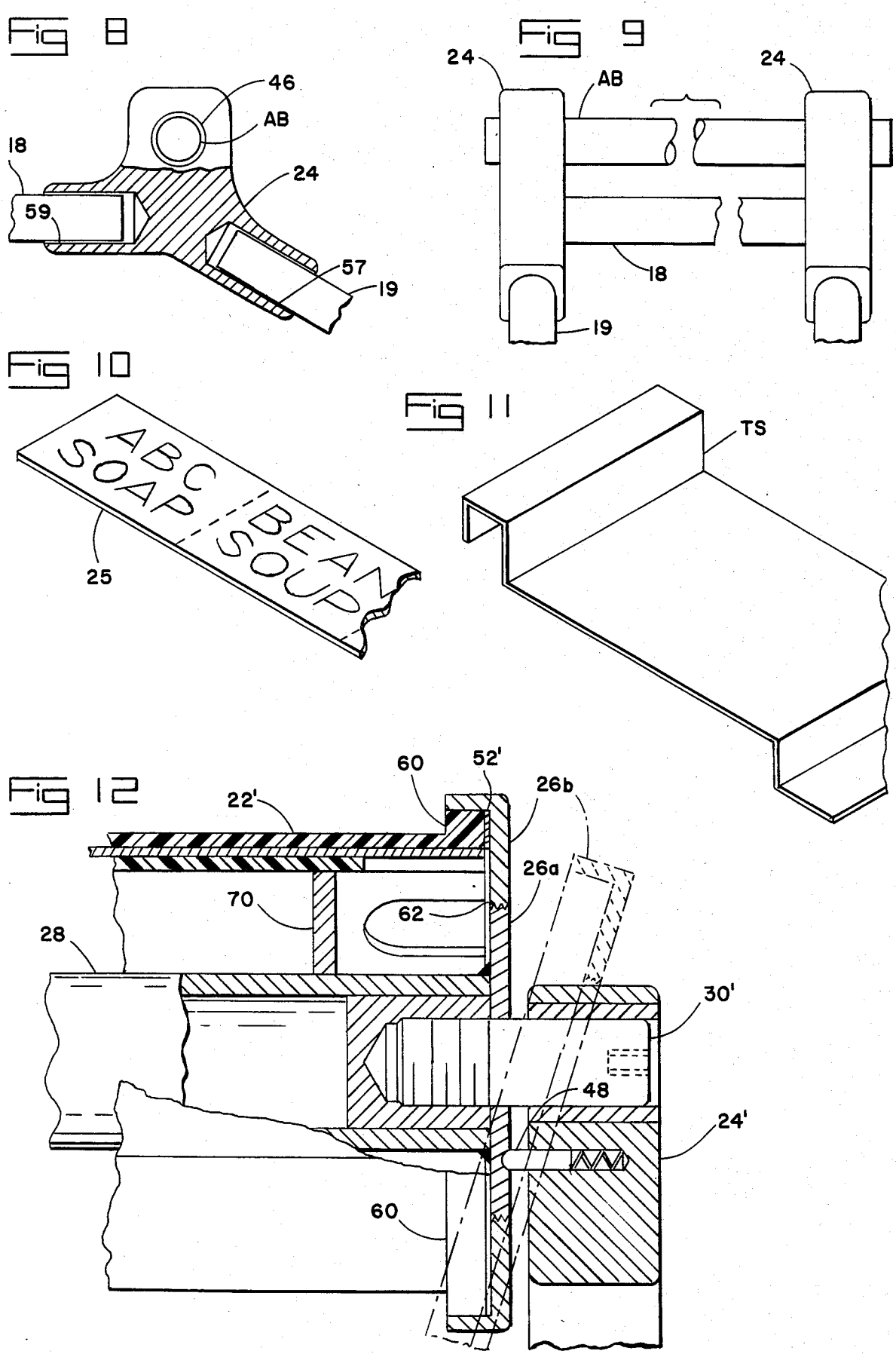

POINT-OF-PURCHASE ADVERTISING FOR SHOPPING CARTS

The present invention relates broadly to the field of advertising and more particularly to an improved, point-of-purchase display device incorporated in shopping carts and to methods relating thereto.

The fundamental purpose of advertising is to persuade potential customers to purchase a given producer's products in preference to that of a competing producer. Virtually every media has been employed for the dissemination of advertising reaching the public in virtually every activity in which they participate. For many products, the most effective advertising is that which can be effected in the stores where the products are sold. This practice is known as point-of-purchase advertising, as exemplified by the display racks of razor blades, chewing gum and other small items at the checkout counters of supermarkets.

Product and advertising display space is limited and at a premium in stores, such as grocery supermarkets, because of the effectiveness of point-of-purchase advertising. Only recently has the use of shopping carts for point-of-purchase advertising been widely recognized. The most common form of this practice is to mount fixed displays at the front of the merchandise basket of the cart, which permits one or two advertisements to be placed on the cart.

The general object of the present invention is to more fully develop the point-of-purchase advertising potential of shopping carts as used in grocery stores, supermarkets and other high volume merchandising marts.

A more specific object of the present invention is to increase the number of advertising displays, or the display space that can be effectively employed on a shopping cart.

Another object of the present invention is to more effectively direct the attention of the cart's user to the advertising display.

A further object of the present invention is to provide flexibility and ready updating of advertising displays to facilitate product promotions.

Yet another object of the present invention is to provide a point-of-purchase advertising display device which can be incorporated into existing shopping cart configurations and further to do so without adverse affect on their normal use for shopping purposes.

Yet another object of the present invention is to provide such a device which is both inexpensive and sufficiently rugged to withstand the abuse to which shopping carts are subjected in use.

In one aspect of the invention, these ends are attained by a shopping cart having a merchandise basket, or receptacle. Such carts are mounted on wheels and pushed by a handle rearwardly of the basket.

In accordance with the present invention, a display tube is journaled on the frame structure of the cart with its axis generally parallel to the cart's handle. The display tube is disposed adjacent the upper, rear end of the merchandise basket. Advantageously, the display tube is disposed between and spaced from the handle and the basket.

Preferably, the display tube is transparent and means are provided for mounting printed advertisements within the tube to protect them from vandalism and from the elements. Any of many so-called plastics, or polymers may be employed as the material for the tube material, polystyrene and polycarbonate being exemplary. It is also advantageous that the display tube be polygonal in section to provide discrete display surfaces to which a shopper's attention will be directed, an octagonal section being preferred.

Constructional features of the invention are found in use of brackets to journal the display tube. These brackets are rigidly secured to the frame structure of the cart and journal trunnions which project from a display tube assembly which further include caps which engage opposite ends of the display tube. Alternatively, fixed trunnions may project inwardly from the frame brackets, with the end caps journaled thereon.

For greater strength a shaft may be provided internally of the display tube. With the end caps clamped thereto, the display, which is relatively weak, may be isolated, as a load bearing member, from stresses which would result from physical abuse to the cart that could cause substantial flexing of the frame structure.

To facilitate replacement of the advertising copy, one of the end caps may be provided with an outer, removable portion. When this portion is removed, access is had to the interior of the display tube for removal of advertising strips and the insertion of new strips. Alternatively, and in accordance with a method aspect of the invention, the display tube assembly may be temporarily supported by a bracket which engages the handle and another portion of the cart to underly the display tube assembly. With this temporary support in place, the trunnions may be removed to permit the display tube to be lifted free of the cart for replacement of the advertising copy.

A final method aspect of the invention relates to the mounting of journal brackets on the cart. These brackets are loosely positioned on side frame members. A shaft is inserted through bores for the trunnions bringing them into alignment. Also the handle may be inserted into these brackets. The key feature is that the bores for the trunnions are aligned. With this alignment attained, the brackets are rigidly secured to the frame members and the handle. Preferably, this attachment is made by brazing, welding or the like. Having thus secured the brackets in place, assurance is had that the display tube will rotate freely to enable a shopper to see all display surfaces.

The above and other related features of the invention, will be apparent from a reading of the following description of preferred embodiments of the invention and the novelty thereof pointed out in the appended claims.

In the drawings:

FIG. 1 is a rear view of a shopping cart in which the present invention is embodied;

FIG. 2 is a side view of the shopping cart seen in FIG. 1;

FIG. 3 is a side view, on an enlarged scale, of the advertising display seen in FIG. 2;

FIG. 4 is a rear view of the right hand portion of the display seen in FIG. 3;

FIG. 5 is a view, on a further enlarged scale, taken generally on line 5—5 in FIG. 3;

FIG. 6 is a section, on a further enlarged scale, taken on line 6—6 in FIG. 3;

FIG. 7 is a section taken generally on line 7—7 in FIG. 5;

FIGS. 8 and 9 are fragmentary side and rear views of the shopping cart, illustrating a step in the installation of the present advertising display;

FIG. 10 is a fragmentary perspective view of an advertising strip employed herein;

FIG. 11 is a perspective view, with portions broken away, of a temporary support employed in changing advertising copy;

FIG. 12 is a vertical section through an end portion of another embodiment of the present invention, taken on line 12—12 in FIG. 13;

Figure 13:
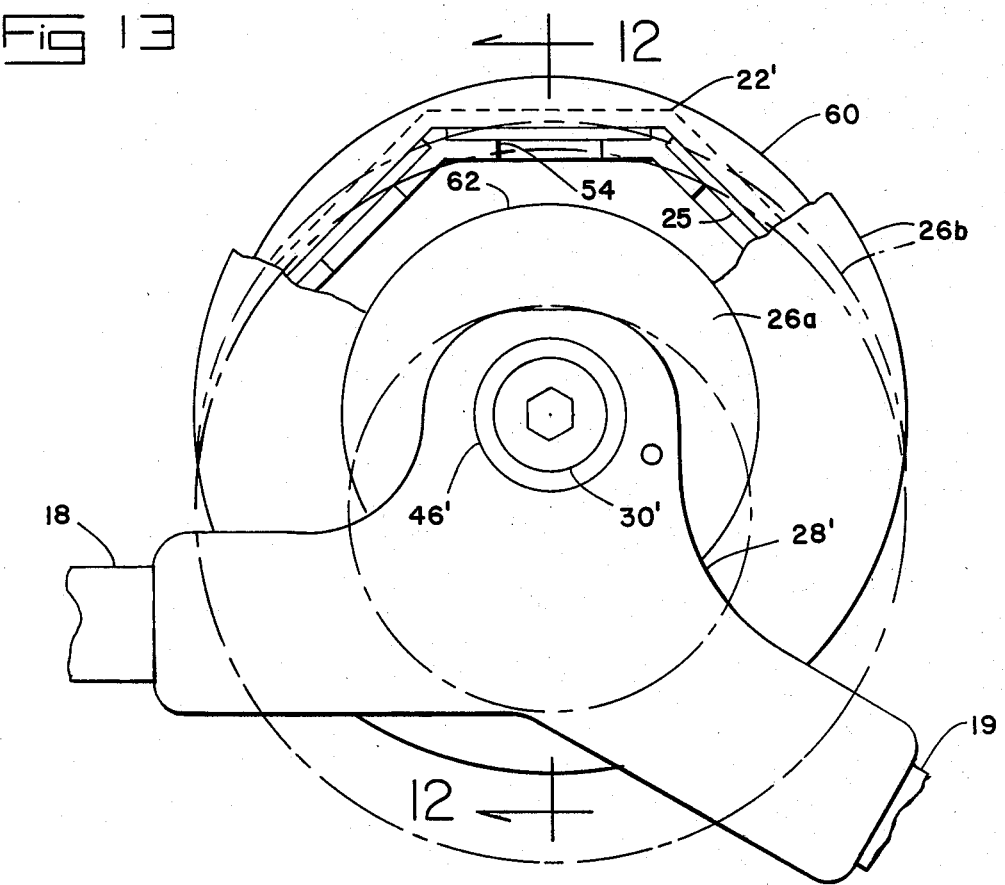
FIG. 13 is a side view, with portions broken away, of the embodiment seen in FIG. 12.

As indicated, the overall object of the present invention is to provide improved point-of-purchase advertising on shopping carts, as used in supermarkets, or the like. Such carts vary widely in specific design details, a typical cart being depicted in FIGS. 1 and 2, and designated by reference character 10. Generically such shopping carts are characterized by a merchandise receptacle, or basket 12, generally of openwork, wire construction, supported by a frame structure 14, generally formed by bent steel tubing. The frame structure is supported by a plurality of wheels 16. Rearwardly of the basket 12 and generally on the same level as the upper end thereof is a handle 18 which is connected to the vertical members 19 of the frame structure 14. The well known usage of such a cart is for shoppers to push or propel it by the handle 18 along the aisles of the market, depositing merchandise into the basket 12 as they go along. This merchandise is then paid for, bagged and returned to the cart for the convenience of the shopper to convey the purchases outside the store to his automobile.

In accordance with the present invention, a point-of-purchase advertising display, indicated generally by reference character 20, is provided on the cart 10 adjacent the handle 18. Referencing also FIGS. 3 and 4, it will be seen that the advertising display 20 comprises a display tube 22, of octagonal section, which is journaled on brackets 24 for rotation about an axis generally parallel to the handle 18. The brackets 24 are secured to vertical side frame tubes 19 which form a part of the frame structure of the shopping cart. The handle 18 is likewise secured to the brackets 24.

Preferably the display tube 22 is transparent and the advertising is printed on strips 25 (see FIG. 10) which may be viewed by the shopper as the cart is pushed through the store, thus providing an effective promotion of the advertised products as the shopper passes through the aisles of the store.

Additional reference is made to FIGS. 5 and 7 for a description of the constructional features of the display 20. The display tube 22 is supported by end caps 26 which are positioned centrally of, and clamped against, a central shaft 28, by trunnion bolts 30 threaded into opposite ends of the shaft. The constructional details of the two ends of the display tube assembly and the journaling thereof are identical and, for the sake of simplicity, only one end is fully shown in the drawings. More specifically each bolt 30 has a shoulder 32 which clamps the web portion of the end cap against the shaft. The shaft 28, for reduced weight, is compositely formed by a tube having plugs 34 welded into its opposite ends. The plugs are set back from the ends of the tube forming recesses for receiving sealing gaskets 38.

The transparent display tube 22 is positioned by octagonal recesses in the flanges 39 of the end caps 26. A second octagonal tube 40 is telescoped with the display tube 22 and spaced from its inner surface by corner ribs 42, thereby forming elongated recesses 44 for receiving the advertising strips 25.

The display tube assembly includes the display tube 22, the advertising strips 25 (when in place), the inner strip support 40, end caps 26 the inner shaft 28 and the trunnion bolts 30. The trunnion bolts are journaled in antifriction bushings 46, which are provided with flanges 47 which facilitate rotation of the display tube.

Detent means are provided to nominally position the display tube 22 so that its display surfaces are properly angled for view by the shopper using the cart. As indicated in FIG. 6, the detent means take the form of a spring loaded plunger 48, slidably mounted in the bracket 24 and engagable with recesses 50 formed in the adjacent end cap 26. Preferably these recesses are oriented to successively bring the display faces of the tube 22 into a horizontal position. Preferably the outer surface of the end caps are of circular outline and knurled to facilitate rotation of the display tube.

In normal usage shopping carts are exposed to outside weather conditions and it is an important consideration to prevent entry of water into the interior of the display tube assembly. As previously noted, the gaskets 38 serve this function at the point where the trunnion bolts pass through the end caps 26. Similarly, gaskets 52 are provided between the ends of the tube 22 and the end caps 26.

A widely employed feature of grocery store advertising is the promotion of weekly specials and other specials of relatively short duration. Thus, it is highly desirable to be able to readily change the advertising copy in the display tube at relatively frequent intervals. This end is accomplished in the described embodiment by first placing a temporary support TS (See FIG. 11) beneath the display tube assembly. This support is illustrated in FIG. 3 by phantom lines and comprises a lip that engages the handle 18 and a flange that rests on a rod 21 which extends between the side frame tubes 19.

With this support in place, the trunnion bolts 30, may be removed. The remainder of the display tube assembly rests in the temporary support TS and then may be lifted free of the cart. One of the end caps is removed to gain access to the interior of the tube. The inner tube 40 is provided with slots 54 adjacent its ends, to facilitate removal of the advertising strips 25. New strips 25 may then be inserted into the recesses therefor and the end caps replaced. The display tube assembly is then set on the support which positions the display tube so that the threaded holes for the trunnion bolts 30 are aligned for ready reinsertion of these bolts.

It will be noted that the heads of the bolts 30 are provided with holes 56 for engagement by a spanner wrench to torque the bolts. This feature is provided to minimize the possibility of vandalism or other unauthorized removal of the display tube.

Another feature to be observed is the ready adaptability of this embodiment to existing shopping carts having a tubular frame structure of the type illustrated. In the conventional cart, the handle 18 is simply an integral extension of the side frame tubes 19. In adding the present display device, the handle 18 has, in effect, been severed from the side frames and then the ends of the severed portions inserted into holes formed in the side brackets 24.

Another factor to be considered is that manufacturing tolerances are relatively large. This potentially could result in a misalignment of the holes, or bushings, which journal the trunnion bolts 30. Such misalignment could inhibit the desired rotation of the display tube. This problem is avoided by aligning these holes at the time the brackets 24 are attached to the frame structure. Referencing FIGS. 8 and 9, the brackets 24 are loosely positioned in holes 57 in the side frame members 19 and an alignment bar AB extended through the bushings 46 into alignment. Then ends of the handle 18 can also be inserted into holes 59 the side brackets 24 at this time. It will be seen that the holes 57 and 59 are provided larger in diameter than the frame members 19 and handle 18. This accommodates a range of angular variations of these members, as may be required to align the bushings 46. With the side brackets thus positioned on the frame structure and the bushings 46 in alignment, the brackets are secured in place. Preferably, for rigidity, the brackets 24 are secured to the frames 19 and handle 18 by welding or brazing, or other solidified liquid means, such as epoxy resin as indicated in the drawings. Alternatively, binding screws, or other clamping means may be employed.

A further feature of the described embodiment is its ability to withstand the physical abuse to which shopping carts are subject. An example of such abuse is the manner in which the carts are collected from a parking lot and returned to the store. As many as twenty or thirty of these carts may be telescoped into a single string and pushed along in the collection process. Frequently this string of carts will be turned in its direction of travel, subjecting the frame structures to considerable bending forces. To the extent that these forces are transmitted to the display tube assembly, they are taken by the shaft 28, which isolates the relatively weak, or brittle, transparent, plastic display tube from becoming a load bearing member.

FIGS. 12 and 13 illustrate an embodiment of the invention which provides for more rapid replacement of the advertising strips 25. The functional elements of the display tube assembly are equivalent to those previously described.

The display tube 22' is modified by the provision of a flange 60, the outer surface of which has a circular outline. One end cap is modified, becoming a two piece construction designated by reference characters 26a and 26b. The central web portion 26a may be permanently secured to the hollow shaft 28, as by welding. The outer flanged portion 26b is threaded onto the web portion 26a, at 62, to complete the end portion of the end cap and to provide the recess for rotatably receiving the display tube flange 60, all as is illustrated in FIG. 12. Again a gasket 52' is provided between the end of the display tube 22' and the flange portion 26b to prevent entry of water into the interior of the display tube assembly. Since the web portion 26a of the end cap is welded to the shaft 28, and as later will be seen, the display tube assembly is otherwise sealed in this area, only the gasket 52' is required to seal this assembly. Thus it will be seen that trunnions 30' are threaded into blind holes in the plugs 34' which comprise the hollow shaft 28. These trunnions, again, are journaled on anti-friction bushings 46.

For purposes that later appear, the side brackets 28 are modified to reduce their heights, and have a curvature generally formed on a lesser radius than that of the thread joint 62 between the two end cap portions, as seen in FIGS. 12 and 13. The reduction in height of the end caps make desirable relocation of the detent means, which, as can be seen in the drawings are now positioned beneath the trunnions 30', a spring loaded plunger 48 again being employed for engagement with the recesses 50.

From the foregoing description, it will be apparent that the display tube 22' provides the same point-of-purchase advertising as the first embodiment, being rotatable to bring successive advertising strips into the view of a shopper.

When it is desired to change advertising copy, the flange portion 26b of the end cap is removed. To facilitate such removal, alignable holes are provided on one end cap 24' and the web portion 26a. A pin, not shown, may be slipped into these holes to lock the display tube assembly against rotation and permit the end cap flange portion 26b to be rotated and removed.

Once the flange portion 26b is removed, it can be dropped and angled to the position shown by phantom lines in FIGS. 12 and 13. It will be noted that, in the present embodiment, there is a clearance between the display tube assembly and the end caps which approximates the thickness of the web portion at the flange connection 62. This clearance is provided at both ends of the assembly. It is also preferable to provide detent pins in both of the brackets 24'. It will also be noted that the trunnions 30' are headless. These features permit the display tube assembly to be shifted laterally and the flange portion of the end cap to be angled, as seen in FIG. 12. As thus angled, and with the reduced height of the side bracket 24', the ends of the tube 22' and 40 are exposed to permit removal of an advertisement strip 25 and its replacement with a strip having new copy. The display tube 22' may, of course, be rotated to enable replacement of all advertising strips.

Adjacent the removable portion of the end cap is a flange 70, projecting from the shaft 28. The flange 70 supports the display tube 22', through the tube 40, during replacement of the strips 25.

It will be appreciated that it is sufficient to provide a separable end cap at only one end of the assembly.

The two embodiments, thus far described, are provided with an internal, load bearing shaft which isolates the display tube from forces which might tend to fracture or otherwise damage the display tube. In certain types of shopping cart construction, the frame has sufficient rigidity that the forces which might be transmitted to the display assembly are relatively low and within the strength capabilities of the transparent material from which the tube 22 is formed. In such case, economies can be obtained through elimination of the internal shaft.

Figure 14:
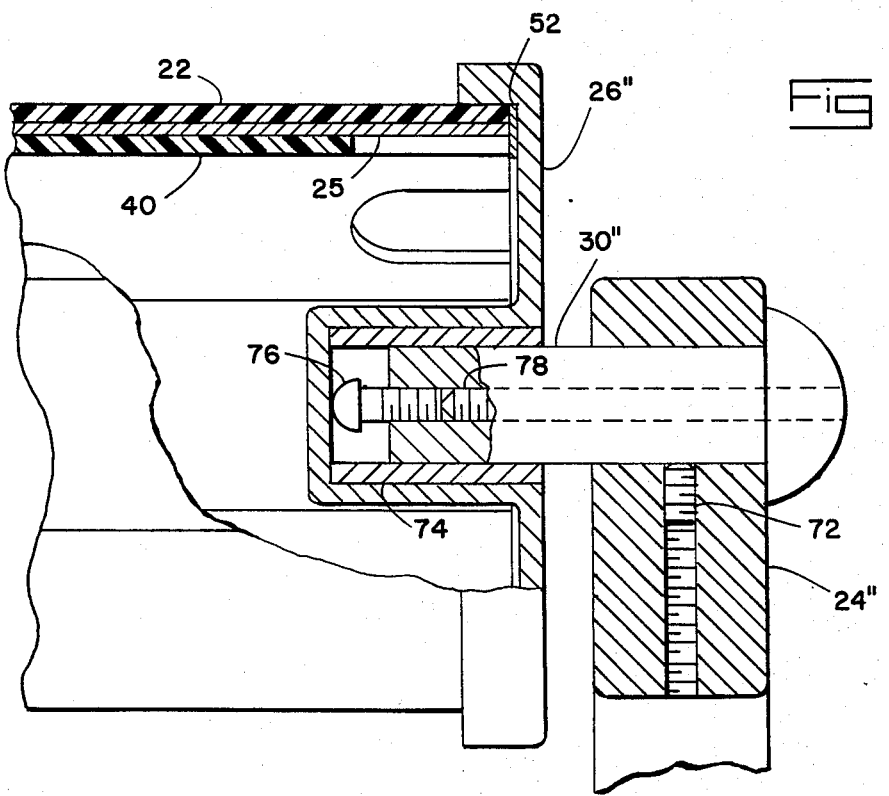
FIG. 14 is a vertical section similar to FIG. 12, but illustrating yet another embodiment of the invention.

Such a display is illustrated in FIG. 14. In this case the trunnions 30" are fixed in the side brackets 24" by set screws 72 threaded from beneath through their lower surfaces. These trunnions project inwardly and are journaled on bushings 74 provided in blind holes in end caps 26". The end caps have recesses of octagonal outline which receive the ends of the display tube 22.

The display tube is positioned laterally between the brackets 24" by spherical buttons 76 which are threaded into the trunnions 30". In assembly the trunnions 30" are first locked in place by set screws 72. The buttons are then advanced to engage the buttons of the holes in which the bushings are positioned. The buttons are then held in this position by jam screws 78 which are accessible through the trunnions 30".

The point contact between the buttons 76 permits sufficient force to be exerted to seal the ends of the display tube 22 against the gasket 52 and yet permit ready rotation of the display tube.

Variations in the described embodiments will be apparent to those skilled in the art and, accordingly, the scope and spirit of the present invention is to be ascertained from the following claims.

Having thus described the invention, what is claimed as novel and described to be secured by Letters Patent of the United States is:

1. A method of rapidly replacing advertising strips in a rotary display mounted on a shopping cart wherein the display comprises a display tube assembly journaled on side brackets carried by the frame structure of the cart, said method comprising the steps of,
   providing a temporary support means for holding the tube in its normal position relative to said brackets;
   removing the means journaling the tube assembly on said brackets whereby the assembly is supported by the temporary support means,
   lifting the assembly from between the brackets,
   replacing advertising strips in the tube;
   replacing the tube assembly between the brackets and supporting it by said temporary support means;
   replacing the journaling means and;
   removing the temporary support means.

2. A method of installing rotary advertising displays on shopping carts having a frame structure which includes said frame members, comprising the steps of;
   loosely assembling a bracket on each side frame member;
   inserting a rod through journal bores in the brackets to bring said bores into alignment;
   positioning the bar essentially normal to the centerline of the cart, and;
   positively securing the brackets, as thus positioned, to the side frame members,
   whereby a display tube assembly journaled through said bores will rotate freely and be properly oriented relative to the cart.

3. A method as in claim 2 wherein,
   the means for securing the brackets includes the use of liquified solids to firmly embed the frame members in the bracket.

4. A shopping cart comprising a merchandise receptacle,
   frame structure supporting said receptacle,
   wheels mounted on said frame structure and supporting said receptacle for rolling movement,
   said frame structure including vertical frame members extending toward the rear of the receptacle and a handle extending between the upper ends of said vertical frame members, said handle being disposed behind and generally toward the upper end of said receptacle and spaced therefrom,
   whereby the cart may be pushed by a user when shopping,
   characterized by a rotary, point-of-purchase display,
   said display including a tube, disposed adjacent the upper rear portion of the receptacle, and spaced from the handle a distance sufficient for the handle to be readily gripped by a shopper when using the cart,
   said display tube being of polygonal cross section, thereby providing planar display portions, said display tube further being transparent, whereby advertisements positioned on the inner surfaces of the tube may be viewed by a shopper and protected from abuse,
   means for journaling said display tube on said frame structure with its axis generally parallel to said handle,
   means for positioning replaceable strips of printed advertising material against the inner surfaces of the planar display portions, whereby the display tube may be rotated to bring successive advertisements on the tube to the attention of shoppers as the cart is in use, and
   further characterized by
   end caps embracing the ends of the display tube and, the journal means including
   a pair of brackets respectively secured to the upper ends of the vertical frame members and having aligned bores, and
   inwardly projecting trunnions secured in the bores of said brackets, said end caps having central bores in which the trunnions are journaled.

5. A shopping cart as in claim 4 wherein
   the bores in the end caps have closed ends and,
   further including,
   means providing an anti-friction contact between the trunnions and the closed ends of the bores in the end caps and,
   means for axially adjusting one of said anti-friction means to maintain the end clamps in clamped relation against the display tube while permitting its rotation.

6. A shopping cart comprising a merchandise receptacle,
   frame structure supporting said receptacle,
   wheels mounted on said frame structure and supporting said receptacle for rolling movement,
   said frame structure including vertical frame members extending toward the rear of the receptacle and a handle extending between the upper ends of said vertical frame members, said handle being disposed behind and generally toward the upper end of said receptacle, whereby the cart may be pushed by a user when shopping, characterized by a rotary, point-of-purchase display.
   said display including a tube, disposed adjacent the upper rear portion of the receptacle.
   means for journaling said display tube on said frame members, with its axis generally parallel to said handle,
   whereby the display tube may be rotated to bring successive advertisements on the tube to the attention of shoppers as the cart is in use, and
   further characterized in that the means for journaling the display tube comprise
   a load bearing shaft extending, internally of said tube, between the vertical frame members, and rotatable relative thereto,
   means for mounting the advertising display tube on said shaft, isolated from stresses resulting from distortion of the frame structure.

7. A shopping cart as in claim 6 wherein the means for mounting the advertising tube comprise
   end caps respectively embracing opposite ends of said tube, and means for securing said caps to said shaft in fixed spaced relation from each other.

8. A shopping cart as in claim 7 wherein the journal means include,
   a pair of brackets respectively secured to the upper ends of said vertical frame members and having aligned, horizontal bores, and a pair of headed trunnions respectively threaded into opposite ends of said shaft and journaled in said bores.

9. A shopping cart as in claim 8 wherein a shoulder bushing is disposed between the head of each trunnion and the adjacent end cap, said shouldered bushing providing clearance between the head of the trunnion and the bracket for free rotation of the display tube, while clamping an end cap against the shaft.

10. A shopping cart as in claim 7 further comprising resilient sealing means disposed between the end caps and the ends of the display tube, thereby protecting the advertising material from the elements.

11. A shopping cart as in claim 7 wherein, the outer portion of one end cap is removable to facilitate replacement of the advertising strips.

12. A shopping cart as in claim 11 wherein, the display tube has, a flange of circular outline at the end embraced by said one end cap, the inner web portion of said one cap is secured to said shaft, the removable, outer portion of said one end cap is threaded onto the web portion on a diameter within the outline of the advertising strip support means, said outer portion including a peripheral flange having a circular recess receiving the display tube flange, the journal means include a bracket adjacent said one end cap and secured to a vertical frame member, said bracket having a journal support portion projecting upwardly from the said frame member and handle, and the journal means are axially slideable therein.

13. A shopping cart as in claim 12, wherein the display tube is of polygonal cross section intermediate said end caps.

14. A shopping cart as in claim 12 further comprising a second bracket adjacent the other end cap and secured to the opposite vertical frame member, and in which the journal means are also axially slideable, the end, caps being spaced from said brackets, and spring means for centering the display tube assembly, whereby the spring means may be overcome to enable the outer portion of said one end cap to be removed and tilted for greater access to the interior of the display tube for replacement of the advertising strips.

15. A shopping cart as in claim 14 wherein, the spring centering means include a spring loaded plunger carried by a side bracket, and the end cap has recesses successively engaged by said plunger as the display tube is rotated, the number of said recesses corresponding to the number of display surfaces on said tube, whereby the spring means serve as detent means for yieldingly positioning the display tube in desired positions of rotation.

* * * * *